United States Patent [19]

McGrath

[11] Patent Number: 5,727,932
[45] Date of Patent: *Mar. 17, 1998

[54] ELECTROMAGNETIC RECIPROCATING COMPRESSOR

[75] Inventor: Michael Alan McGrath, Hayling Island, Great Britain

[73] Assignee: Pegasus Airwave Limited, Waterlooville, England

[*] Notice: The term of this patent shall not extend beyond the expiration date of Pat. No. 5,603,612.

[21] Appl. No.: 790,486

[22] Filed: Jan. 29, 1997

Related U.S. Application Data

[62] Division of Ser. No. 556,903, filed as PCT/GB94/01195, Jun. 2, 1994, published as WO94/28308, Dec. 8, 1994, Pat. No. 5,603,612.

[30] Foreign Application Priority Data

Jun. 2, 1993 [GB] United Kingdom .............. 9311385

[51] Int. Cl.[6] .................................. F04B 35/04
[52] U.S. Cl. ................................................ 417/417
[58] Field of Search .................... 417/415, 417, 417/418

[56] References Cited

U.S. PATENT DOCUMENTS

| 4,799,421 | 1/1989 | Bremer et al. ............. 417/418 X |
| 4,966,533 | 10/1990 | Uchida et al. ............. 417/417 X |
| 5,104,299 | 4/1992 | Mizuno et al. ............. 417/417 |
| 5,603,612 | 2/1997 | McGrath .................... 417/417 |

FOREIGN PATENT DOCUMENTS

| 0509660 | 10/1992 | European Pat. Off. ....... 417/417 |
| 1460406 | 2/1989 | U.S.S.R. .................... 417/417 |
| 1 403 299 | 8/1975 | United Kingdom . |
| 1 529 597 | 10/1978 | United Kingdom . |
| WO 87/03342 | 6/1987 | WIPO . |

Primary Examiner—Richard E. Gluck
Attorney, Agent, or Firm—Larson & Taylor

[57] ABSTRACT

An electromagnetic reciprocating compressor has a body (1, 2), a piston (10) reciprocating in a cylinder (12) in the body and a piston guide (14) in the form of an insert which is radially located relative to the axis of the cylinder (12) by fitting against a registration surface (25a), the registration surface is on a body part (1) which also provides the internal cylinder surface (12a) of the cylinder. To improve the alignment of the insert (14), the registration surface (25a) and the internal cylinder surface (12a) are formed to their respective final diameters in the same machining operation by reference to a common axis. The piston guide (14) is axially located related to the cylinder (12) by being resiliently clamped between the stator (23) and an end portion (27a) of the body (1, 2) opposed to the stator (23) with a resilient member (27) interposed between the body end portion (27a) and the piston guide (14).

4 Claims, 5 Drawing Sheets

ELECTROMAGNETIC RECIPROCATING COMPRESSOR

This is a division of application Ser. No. 08/556,903, filed as PCT/GB94/01195, Jun. 2, 1994, published as WO94/28308, Dec. 8, 1994, now U.S. Pat. No. 5,603,612.

TECHNICAL FIELD

This invention relates to electromagnetic reciprocating compressors or pumps, particularly compressors for pumping gas such as air. Such devices can also act as vacuum pumps, but the term "compressor" will be used generally in this specification and claims for convenience.

BACKGROUND ART

Such compressors, which may pump relatively large amounts of air with little compression, have an axially reciprocating piston carrying an armature which is moved through a magnetic field generated by one or more coils. The return stroke of the piston is typically caused by a compression spring. There are many examples of such compressors in the prior art, and reference is made to the following patent specifications as examples, particularly of interest in relation to the present invention:

GB-A-1529597, GB-A-2041092, GB-A-2206931, U.S. Pat. No. 4,090,816, U.S. Pat. No. 4,718,832, U.S. Pat. No. 4,867,656 and U.S. Pat. No. 5,100,304.

Such compressors are required to operate without lubrication and with as little maintenance as possible, for long periods. Their typical rate of operation is the mains frequency, e.g. 50 Hz or 60 Hz. Consequently, the compressor must be designed so that wear caused by the moving piston is minimized, so as to avoid the creation of leakage paths which lead to inefficiency. Another problem is noise, particularly where the compressor is To be used in a quiet environment such as a hospital. Noise may arise as a result of wear of the piston or a surface which it contacts, or from contact of the piston with the cylinder head.

It is common for the compressor to have a piston guide mounted in its body, on the opposite side of the driving coil from the cylinder in which the piston head moves. The piston carries a guide piston, which slides axially in the-piston guide and thus radially locates and guides the rear end of the piston. Such a piston guide is shown for example in U.S. Pat. No. 4,090,816, U.S. Pat. No. 4,718,832 and GB-A-1529597 mentioned above. A piston guide integral with the body casing is shown in GB-A-2206931. An alternative form of piston guide is a rod extending through the centre of the piston, as shown for example in U.S. Pat. No. 5,100,304 and GB-A-2041092.

For efficiency of the electromagnetic drive, the piston guide and the metal casing of the compressor must be electrically isolated. This may involve the use of insulating bushings around screws used to attach the piston guide. It is known to anodize the surface of the piston guide, in order to assist such electric isolation (GB-A-1529597).

To ensure highly precise location of the piston, it is important that the piston guide is very accurately located relative to the axis of the cylinder. It is known to provide a registration surface on the piston guide, particularly an outer peripheral cylindrical surface, which is fitted into an internal cylindrical surface of a body part of the pump. This is shown for example in GB-A-1529597, U.S. Pat. No. 4,718,832 and U.S. Pat. No. 4,090,816, in which the cylinder of the compressor is provided by a cylindrical insert having an exterior peripheral surface on another surface of the body having a different diameter from that receiving the piston guide. GB-A-2206931 shows a similar arrangement, in which the piston guide is an insert in a sleeve integral with a rear body part, while the cylinder surface is provided by an insert in the front body part. The two inserts are of different external diameter.

The present inventors have found that constructions of this type provide insufficiently accurate alignment of the piston guide, relative to the cylinder, leading to uneven wear of the piston during use.

DISCLOSURE OF THE INVENTION

In one aspect the present invention provides an electromagnetic reciprocating compressor having a body, a piston reciprocating in a cylinder in said body, and having a piston guide in the form of an insert which is located relative to the axis of the cylinder by fitting against a registration surface, which surface is on a body part which also provides the internal surface of the cylinder, said registration surface and said cylinder surface being formed to their respective final diameters in the same machining operation by reference to a common axis. Preferably the registration surface and the cylinder surface have the same diameter.

By forming the registration surface in the same operation as the cylinder surface, highly accurate registration of the piston guide relative to the cylinder can be achieved, particularly if the diameters of the cylinder surface and the registration surface are the same. The avoidance of any joint, e.g. between two body parts, by providing both the cylinder surface and the registration surface on a one-piece body part, is preferred and also assists the achievement of high accuracy.

Preferably the registration surface is a rearward extension of the cylinder surface. The registration surface generally is not circumferentially continuous, but may for example be two spaced apart part-cylindrical surfaces.

In the case where the body part (preferably one-piece) providing the cylinder and registration surfaces is of metal, at least the registration surface is preferably anodized, and the corresponding registration surface of the piston guide is also preferably anodized. It is alternatively conceivable to make the body part of plastics, and/or the piston guide of plastics.

In another aspect, the invention provides an electromagnetic compressor having a piston reciprocating in a cylinder, electromagnetic drive means in the body for driving the piston reciprocatingly including a stator, and a piston guide in the form of an insert axially and radially located relative to the cylinder, the piston guide is axially located relative to the cylinder by being resiliently clamped between the stator and an end portion of the body opposed to the stator with a resilient member interposed between the body end portion and the piston guide.

In this construction, electrical insulation is preferably provided between the body end portion, to avoid forming a shorted turn which reduces the electromagnetic efficiency. Preferably the resilient member is electrically insulating for this purpose. Similarly, an electrically insulating member is preferably interposed between the stator and the piston guide.

BRIEF DESCRIPTION OF THE DRAWINGS

An embodiment of the invention will now be described by way of non-limitative example, with reference to the accompanying drawings. In the drawings.

BEST MODE FOR CARRYING OUT THE INVENTION

Figure 1:
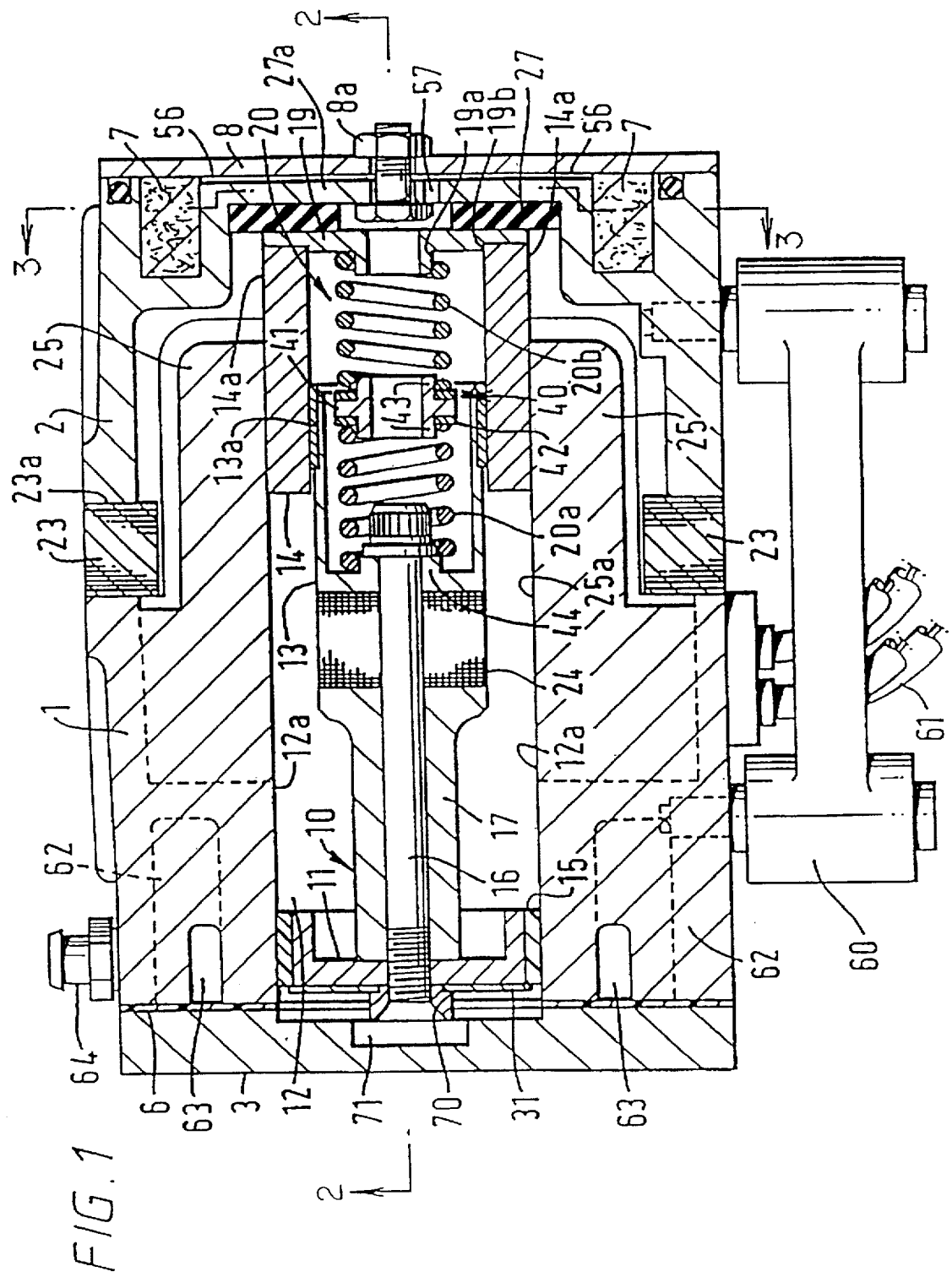
FIG. 1 is an axial cross-sectional view of the embodiment of an electromagnetic linear compressor according to the invention.

The compressor shown in the drawings has a body composed of a main body 1 of square exterior cross-section transverse to the axis and a rear body 2 secured together by bolts 4 (FIG. 2) with washers 5. The bodies 1,2 are ribbed for cooling and strength. A cylinder head 3 is secured by bolts 3a (FIG. 6) in threaded holes 3b to the main body 1, with a one-piece sealing head gasket 6 of thin flexible plastics material, in this instance Melanex™, interposed between them.

The rear body 2 has an annular recess housing a filter 7 for the air passing through the compressor, covered by an end plate 8 secured to the rear body by nut and bolt 8a or similar.

Axially reciprocatingly movable within the compressor is a piston 10 with a piston head 11 located within a cylinder 12 in the body 1 and a rear guide piston 13 slidably located in a piston guide 14 mounted in the main body 1 as described below. The piston head 11 has its peripherally outermost surface provided by an in situ moulded continuous band 15 of plastics material, to minimize leakage of air past the piston.

Within the main body 1 are electromagnetic drive coils 22 (FIG. 2) and between the main body 1 and the rear body 2 there is a stator 23 composed of a conventional stack of magnetically permeable laminations. The piston 10 carries an armature 24 which is driven linearly by the coils 22 and the stator 23, in a known manner, so that the piston 10 is reciprocatingly driven by the linear motor thus constituted in one direction and by the restoring force of a spring arrangement 20 described below in the other direction. The reciprocation frequency is in accordance with the frequency of the applied AC voltage. The details of this driving arrangement need not be described further since it is well known.

FIG. 1 shows that the cylinder surface 12a of the cylinder 12 is extended continuously rearwardly as inner surfaces 25a of two rearwardly projecting arms 25 of the body 1, these arms projecting through the stator 23. The inner surfaces 25a of these arms 25 are thus part-cylindrical surfaces of the same diameter as the cylinder surface 12a, and are formed in the same machining operation as the cylinder surface 12a, so as to have a very high degree of concentricity and coaxiality with the cylinder surface 12a. A typical forming process for these cylindrical surfaces 12a, 25a is first a boring operation of the body part 1, followed by anodizing of the surfaces 12a,25a, and then by a highly accurate honing of the surfaces 12a,25a in a single honing operation by reference to a common axis.

The rear ends of the surfaces 25a form registration surfaces for the exterior peripheral cylindrical surface 14a of the piston guide 14. This exterior cylindrical surface 14a of the guide 14 is also highly accurately machined so as to form an accurate register fit within the surfaces 25a, thus locating the piston guide 14 with a high degree of concentricity with the cylinder surface 12a. This achieves accurate radial location of the piston guide 14. The axial location of the piston guide 14, in abutment with the stator 23 is achieved in this embodiment by a resilient rubber compression body 27 and a spring support 19 to be described below located between the piston guide 14 and an opposed end wall 27a of the rear body 2. Electrical isolation of the piston guide 14 from the main body 1 is achieved by the anodization of the mutually contacting surfaces 14a, 25a of these parts.

The endmost one 23a of the laminations of the stator 23, which is abutted by the piston guide 14, is not a metal lamination but is a sheet of an electrically insulating material, such as a plastics material, in order to electrically isolate the piston guide 14 from the stator 23. The abutment of the piston guide 14 with this endmost lamination of the stator axially locates the piston guide 14. The piston guide 14 is thus resiliently clamped against the rigid stator 23 by the end wall 27a, through the resilient body 27.

As mentioned above, the piston head 11 has an in situ moulded continuous band 15 of low-friction plastics material acting as a piston ring. The guide piston 13 also has around its periphery an in situ moulded continuous band 13a of plastics material acting as a slide surface for the guide piston 13 on the piston guide 14. There may be recesses, in which these bands 13a,15 are moulded, in the form of short screwthreads on the guide piston 13 and the piston head 11 respectively, since such screwthreads provide good keying for the plastics-material and are easily formed. The low-friction plastics material used for the bands 13a, 15 in this embodiment of the invention is injected moulded to a thickness of about 1 mm. The material used is PPS (polyphenylene sulphide) blended with a percentage of a lubricating medium and a percentage of reinforcing fibre. This is machined after moulding to achieve highly accurate concentricity with the piston head or guide piston. A particular advantage of this material is that it has almost the same coefficient of thermal expansion as aluminium, of which the piston head 11 and the guide piston 13 are conveniently made. The difference of coefficient of thermal expansion between the piston head or guide piston and the material of the piston ring bands 13a,15 is preferably less than $2 \times 10^{-6}$/K.

Figure 2:
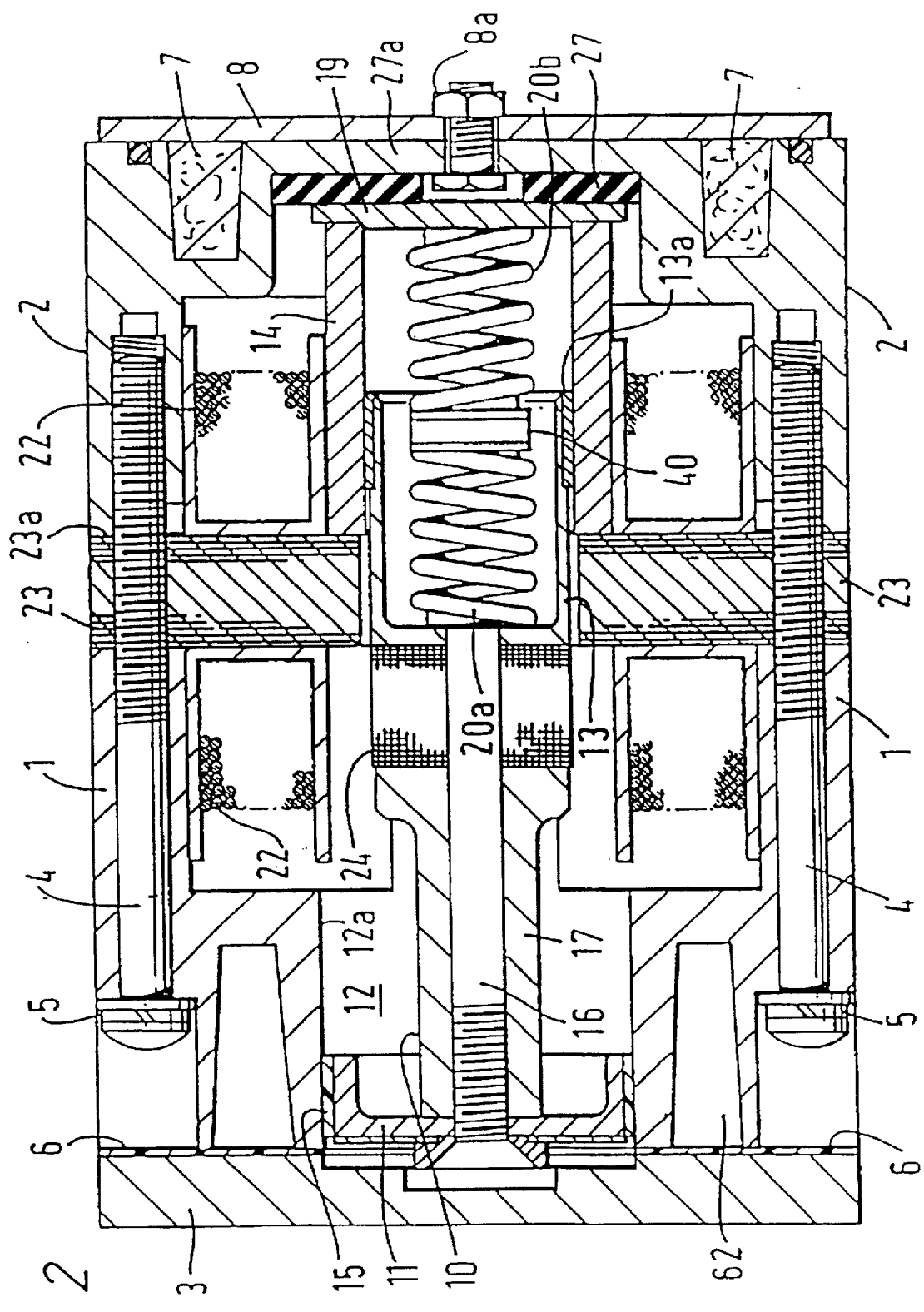
FIG. 2 is a cross-section on the line 2—2 of FIG. 1.

It can be seen in FIGS. 1 and 2 that the portions of the piston guide 14 which do not contact the surfaces 25a of the body projections 25 are thinner walled, in order to avoid the coils 22.

The piston 10 is in several parts, secured together by a bolt 16. The bolt 16 passes through the guide piston 13 and the armature 24 and is screwthreadedly engaged in a spacer part 17. After the part 17 has been tightly threaded onto the bolt 16, the piston head 11 is also tightly screwthreadedly attached to the bolt 16. Finally, after location of a flap valve 31 on the piston face, a nut 70 is secured on the bolt 16 to hold the flap 31 in place.

Figure 3:
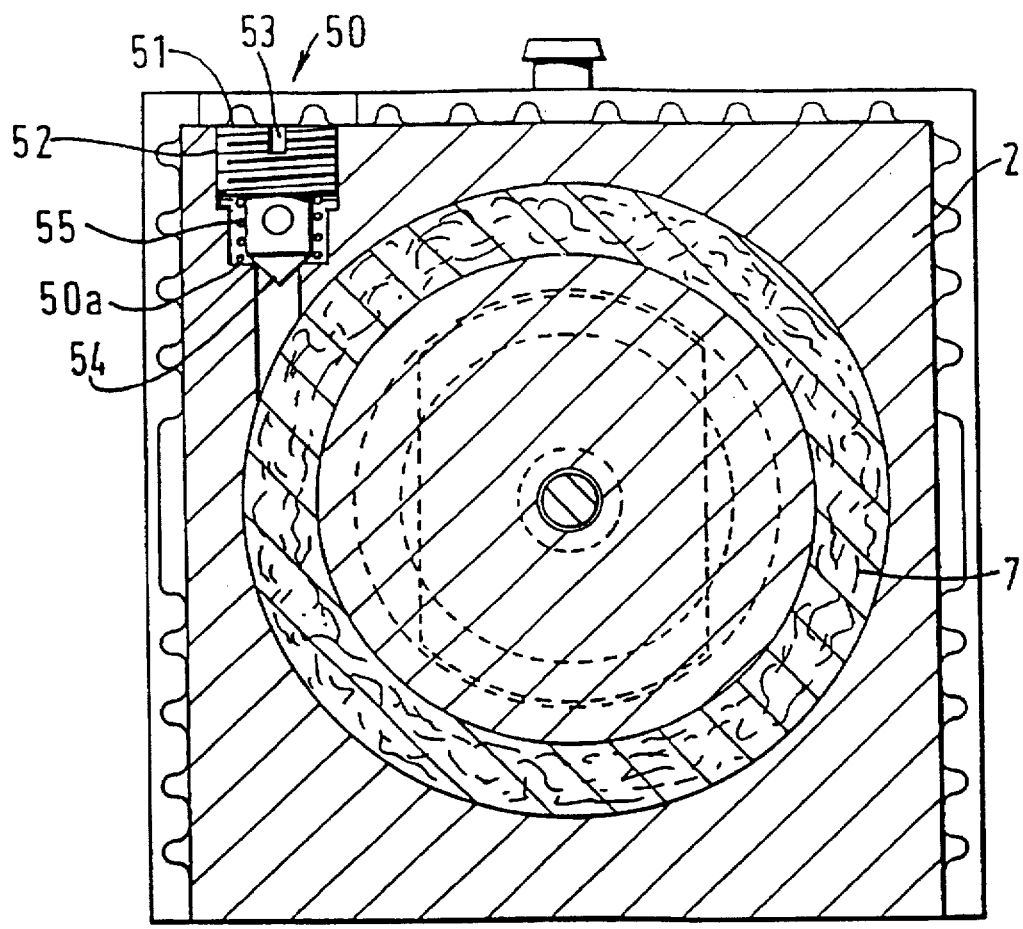
FIG. 3 is a cross-section on the line 3—3 of FIG. 1.

FIG. 3 shows an air inlet passage 50 in the rear body part 2 having in it a flow-control valve body 51, which is screwthreadedly engaged with a screwthread 52 in the wall of the passage 50 and is thus adjustable in position along this screwthread 52. An air passage 53 allows the air to pass through the valve body 51, and the flow of air into the compressor is controlled by the positioning of a conical leading end 54 of the valve body 51 relative to an opposed shoulder 50a of the passage 50. A spring 55 acts on the valve body 51 to prevent its accidental rotation due for example to vibration.

The passage 50 leads to the outside surface of the filter 7. Air passing through the filter 7 goes into a small gap 56 (FIG. 1) between the end plate 8 and the rear body 2, and then via passages 57 in the rear body 2 to inside the compressor, where it flows over the coils 22 to cool them in order to reach the back face of the piston head 11. This tortuous inlet path for the air helps to reduce noise emitted by the compressor.

Figure 4:
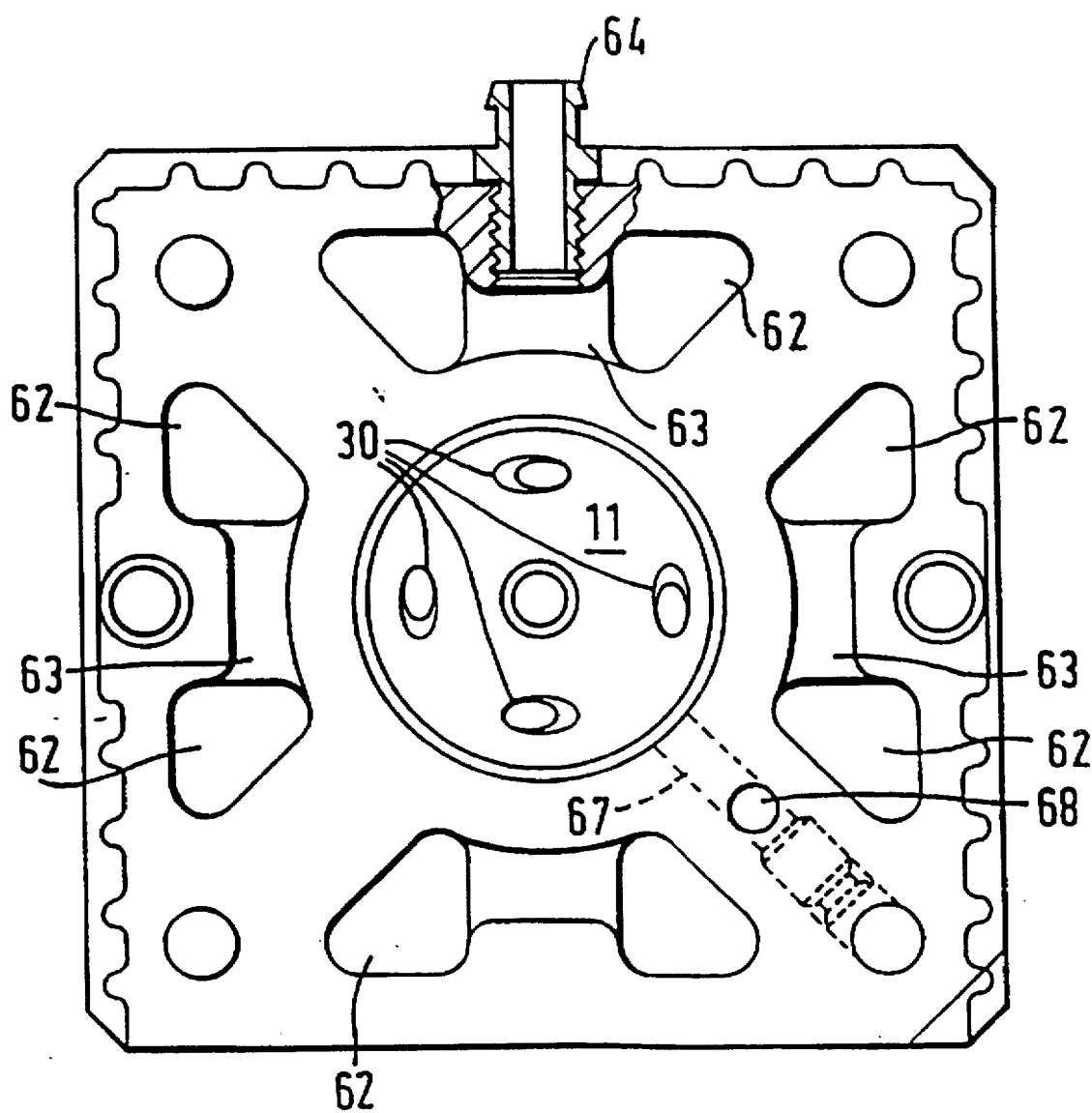
FIG. 4 is an end view, partly sectioned, of the main body of the compressor of FIG. 1, with the cylinder head, head gasket and piston flap valve removed.

FIG. 4 shows that the piston head 11 has four apertures 30 (not shown in FIGS. 1 and 2) through it, which are covered at the head face of the piston head 11 by the flexible flap 31 (FIG. 1) to form a conventional flap valve, for admission of air from within the body of the compressor to the cylinder space in front of the piston on the reverse stroke of the piston. These apertures 30 in the piston head 11 are angled with respect to the axis of the piston. The axis of each aperture 30 is preferably about 30° to the axis of the compressor. A suitable range for this angle is 10° to 45°. The effect of this angling of the apertures 30 is that the air, moving rapidly through these apertures during the return stroke of the piston, applies a unidirectional rotational driving force on the piston by a turbine-like effect, rotating it slightly about its axis. This continual gradual unidirectional rotation about the axis minimizes the unevenness of any wear on the piston and cylinder surfaces of the compressor, i.e. renders such wear as uniform as possible. In combination with the lack of deflection forces and torsional forces from the spring system 20 described below, a predetermined and desired gradual rotation of the piston, due to this turbine effect of the air in the apertures 30, can be achieved. Since the torsional and deflection effects of the springs can be ignored, the desired rotational effect on the piston by the turbine effect is reproducible, in mass production of the compressor. In the present embodiment, a rotational speed of the piston of about 30 rpm has been achieved (the piston-reciprocates at 50 Hz).

Instead of the holes 30 on oblique axes, stepped holes (i.e. holes having portions circumferentially stepped around the piston axis) may be used, to achieve the effect of oblique air flow through the piston which causes its rotation.

Turning now to the compression spring arrangement 20 shown in FIGS. 1 and 2 this has two helical springs 20a and 20b, of mutually opposite helical coiling sense, arranged in series with a rotational bearing 40 mounted between their mutually opposed ends. The bearing 40 is supported only by the springs 20a, 20b and consists of a body 41 having axially projecting spigots 43 which radially locate the ends of the springs 20a, 20b. Around the spigots 43 are low-friction washers 42 on which the ends of the springs 20a, 20b bear. These washers are freely rotatable about the axis of the bearing 40 and are made of moulded PPS containing a lubricating medium and reinforcing fibre. The outer ends of the springs 20a and 20b are received respectively on an axial projection 19a on the spring support 19 and axial projection 44 of the guide piston 13.

The rotational bearing 40 is freely movable radially and axially, so that it provides no constraint against any flexing of the spring system. It allows free relative rotational movement of the inner ends of the springs 20a and 20b, so that no net rotational force is applied by the springs to the piston 10. The opposite coiling senses of the two springs 20a and 20b tend to mean that their torsional forces are cancelled. Because they are relatively short, their tendency to deflect from the axis is small, and the free rotation of one end of each of them also reduces this tendency to deflect.

The spring support 19 is radially located relative to the piston guide 14 by a shoulder 19b which makes a register fit with the rear end of the piston guide 14.

FIG. 1 shows a mounting bracket 60 of the compressor and electrical leads 61, these parts being omitted from the other drawings, for simplicity.

The cylinder outlet valve and air flow arrangements at the cylinder head end will now be described.

FIGS. 1, 2 and 4 show that the cylinder body 1 has in it at its forward end face eight deep recesses 62 which are arranged in pairs, the two members of each pair being joined in each case by one of four shallower recesses 63 in the body end face. One of these shallower recesses 63 is in communication with the outlet 64 of the compressor. In order to provide communication between these respective groups of recesses 62,63, the cylinder head 3 has four recesses 65 in its face opposing the main body 1. The recesses 65 have sloping or bevelled rear faces 66 (two of these recesses can be seen in FIG. 6). Each of these recesses 65 is of a size so as to provide communication between two adjacent non-communicating deep recesses 62 of the main body 1. Thus around the head end of the cylinder there is a continuous gallery for movement of air, provided by the recesses 62,63 and 65. This gallery has a tortuous shape, which reduces noise emerging from the compressor. The volume of the gallery also provides a smoothing effect, reducing the pressure pulsing effect of the rapidly moving piston of the compressor.

Figure 5:
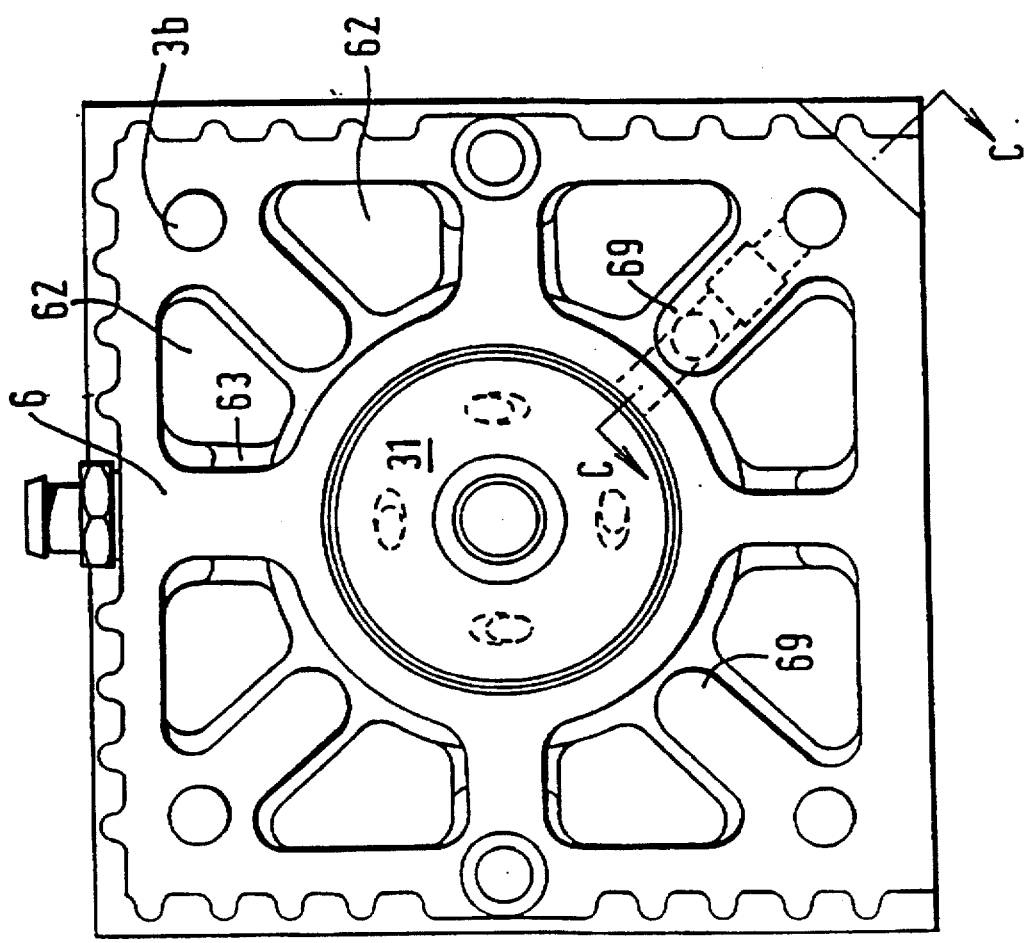
FIG. 5 is an end view in the same direction as FIG. 4 with the head gasket and the piston flap valve in place.

The gallery just described communicates with the interior of the cylinder 12 via a passage 67 opening in a side wall of the cylinder 12 and terminating at an outlet end 68 in the end face of the body 1, at a location corresponding to one of the recesses 65 of the cylinder head 3. As FIG. 5 shows, the head gasket 6 lying between the cylinder head 3 and the main body 1, which seals around the head end of the cylinder 12, has four inwardly directed integral flap portions 69 one of which covers the outlet end 68 of the passage 67 thus forming a flap valve permitting flow of the compressed air out of the cylinder 12 but preventing reverse flow into the cylinder through the passage 67. This flap portion 69 moves within the recess 65 of the cylinder head 3 between its closed and open positions, and the length of its travel between these positions is determined by the angle of the bevel rear face 66 of the recess 65.

It can be seen from FIG. 5 that the gasket 6 can be mounted in any one of four different positions angularly spaced by 90°, in each of which one of the integral flap portions 69 constitutes the flap valve controlling the flow of air in the passage 67. Likewise the cylinder head 3 can also be secured to the body 1 in any one of four positions, also angularly spaced by 90°. The four different recesses 65 of the cylinder head 3 have respectively different bevel angles of the bevelled rear faces 66. Consequently, the characteristic of the flap valve arrangement at the outlet of the passage 67 is different for each of the four positions of the cylinder head, because the travel of the valve member 69 is different and also the volume of the recess 65 is different in each case.

Figure 7:
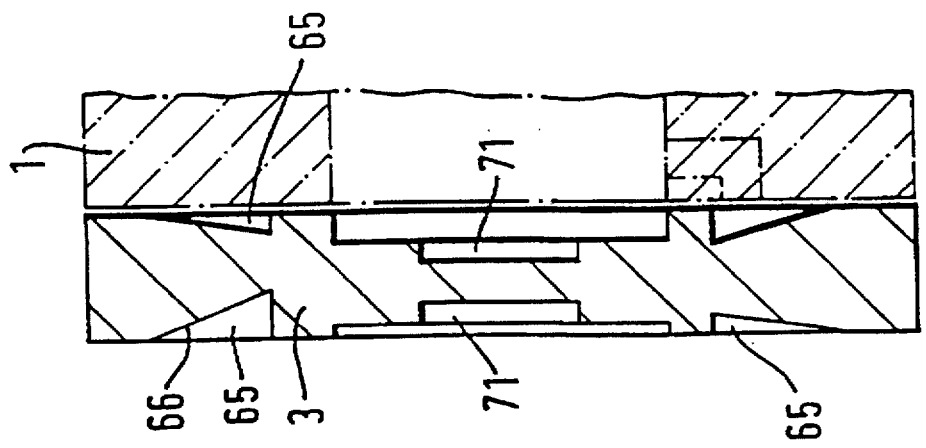
FIG. 7 is a cross-section of a modified form of the cylinder head shown in FIG. 6.

Furthermore, in the modification shown in FIG. 7, the cylinder head 3 is reversible so that either of its main faces can face towards the main body 1 of the compressor. For this purpose it has four of the recesses 65 on each of its two main faces and it also has two different central recesses 71, so that the effective volume of the cylinder 12 at its head end is different, depending on which of the two reverse positions of the cylinder head 3 is chosen. This again allows some adjustment of the characteristics of the compressor. FIG. 7 also shows different bevel angles of the rear faces of the recesses 65.

These possibilities for adjustment of the characteristics of the compressor allow it to be adapted according to a particular use, depending on the relationship of the volume of air flow and the pressure of the emitted air.

Figure 6:
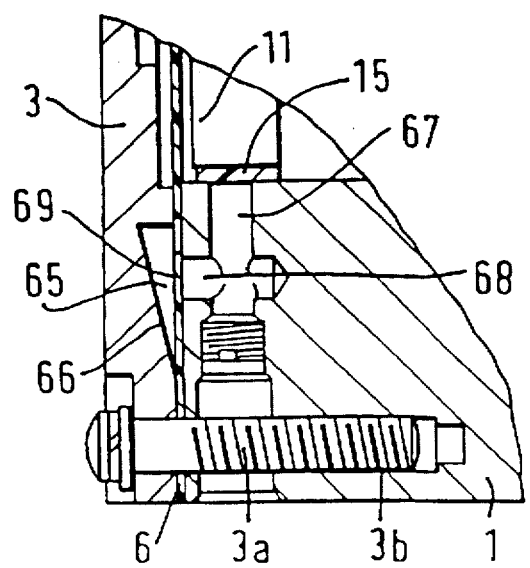
FIG. 6 is a partial section on line 6—6 of FIG. 5, with the cylinder head in place.

It can be seen from FIG. 6 that when the piston head 11 approaches the limit of its travel towards the cylinder head 3, its ring band 15 closes the outlet passage 67. This means that during the final portion of the travel of the piston, air is compressed between the piston head and the cylinder head, which causes the piston to stop before it hits the cylinder head. Since the band 15 is a one-piece moulded construction and is continuous around the piston head 11, there is no leakage path between the space in front of the piston and the passage 67, in any rotational position of the piston, after the band 15 has come alongside the passage 67.

I claim:

1. An electromagnetic linear compressor comprising:

a body having an end portion;

a cylinder provided inside said body;

at least one fluid inlet path to said cylinder including a fluid inlet valve in said inlet path;

at least one fluid outlet path from said cylinder including a fluid outlet valve in said outlet path;

a compression piston reciprocatable in said cylinder;

an electromagnetic drive means for reciprocating said compression piston in said cylinder to move a fluid from said inlet path to said outlet path, said electromagnetic drive means including a stator located between parts of said body;

a piston guide inserted in said body so as to be axially and radially located relative to said cylinder, and having a guide surface therein;

a resilient member; and a guide piston member which is axially spaced from said compression piston, which reciprocates with said compression piston, which slidably engages said guide surface of said piston guide, and which is axially located by being resiliently clamped between said stator and said end portion with said resilient member interposed between said piston guide and said end portion.

2. A compressor according to claim 1 wherein said resilient member is electrically insulating.

3. A compressor according to claim 1 wherein an electrically insulating member is interposed between said stator and said piston guide.

4. A compressor according to claim 3 wherein said stator comprises a stack of magnetically permeable laminations, and wherein said electrically insulating member is a sheet located at one end of said stack.

* * * * *